United States Patent
Dalvi et al.

(10) Patent No.: US 9,544,079 B2
(45) Date of Patent: Jan. 10, 2017

(54) TIME SYNCHRONIZATION IN A SATELLITE NETWORK

(71) Applicant: VT IDIRECT, INC., Herndon, VA (US)

(72) Inventors: Aneesh Vasudev Dalvi, Ontario (CA); Mohsen Amiri Farahani, Ontario (CA)

(73) Assignee: VT IDIRECT, INC., Herndon, VA (US)

( * ) Notice: Subject to any disclaimer, the term of this patent is extended or adjusted under 35 U.S.C. 154(b) by 131 days.

(21) Appl. No.: 14/569,339

(22) Filed: Dec. 12, 2014

(65) Prior Publication Data
US 2015/0215031 A1  Jul. 30, 2015

Related U.S. Application Data

(60) Provisional application No. 61/915,918, filed on Dec. 13, 2013.

(51) Int. Cl.
| | |
|---|---|
| *H04W 56/00* | (2009.01) |
| *H04J 3/06* | (2006.01) |
| *G01S 19/23* | (2010.01) |
| *H04B 7/185* | (2006.01) |

(52) U.S. Cl.
CPC ......... *H04J 3/0697* (2013.01); *H04B 7/18517* (2013.01); *H04B 7/18578* (2013.01); *H04W 56/001* (2013.01); *H04W 56/0015* (2013.01)

(58) Field of Classification Search
CPC . H04B 7/2678; H04B 7/2675; H04B 7/18517; H04B 7/18578; H04J 3/0602; H04J 3/0635; H04J 3/0697; H04J 3/0655; H04W 56/001; H04W 56/005; H04W 56/0015; H04N 21/4305
See application file for complete search history.

(56) References Cited

U.S. PATENT DOCUMENTS

| | | | | |
|---|---|---|---|---|
| 4,882,739 A | * | 11/1989 | Potash | H04J 3/0682 375/358 |
| 7,215,652 B1 | * | 5/2007 | Foley | H04B 7/212 370/316 |
| 7,263,090 B2 | * | 8/2007 | Cronin | H04B 7/2125 370/350 |
| 2005/0058224 A1 | * | 3/2005 | Alagha | H04B 7/18523 375/316 |
| 2010/0034136 A1 | * | 2/2010 | Brener | H04B 7/18584 370/321 |

* cited by examiner

*Primary Examiner* — Ahmed Elallam
(74) *Attorney, Agent, or Firm* — Oblon, McClelland, Maier & Neustadt, L.L.P.

(57) ABSTRACT

A remote device comprising a remote clock oscillator with relatively low precision, a receiver that receives time packets transmitted periodically from the hub device via the satellite, each time packet including a hub real time clock (RTC) value and a hub network clock reference (NCR) value, a remote RTC counter that represents a remote RTC value at the remote, a remote NCR counter that represents a remote NCR value at the remote, and processing circuitry that extracts the hub RTC value and the hub NCR value from a current time packet, compares contents of the current time packet with contents of a previously received time packet, and adjusts the remote RTC counter based on the result of the comparison to synchronize the remote RTC value at the remote with the hub RTC value.

20 Claims, 12 Drawing Sheets

| S '1' | E '1' | L '1' | - | Length (12 bits) | Protocol Type = 0x00F0 |
|---|---|---|---|---|---|
| \multicolumn{6}{c}{Payload (length = 144 bits)} |||||||
| NCR (42 bits) || Future use (22 bits) | Time-stamp (seconds) (48 bits) | Time-stamp (nanoseconds) (32 bits) | RCM frequency (64 bits) |

TIME SYNCHRONIZATION IN A SATELLITE NETWORK

PRIORITY INFORMATION

This application claims the benefit of priority under 35 U.S.C. §119(e) to US Application No. 61,915,918, filed Dec. 13, 2013, the entirety of which is hereby incorporated by reference.

BACKGROUND

The disclosure relates in general to satellite communication and, in particular, to an apparatus and method for time synchronization in a satellite network.

Normal communication within a satellite network utilizes network clock reference (NCR) based synchronization (as described in DVB-RCS/RCS2). However, applications that use remote devices that communicate within the satellite network sometimes require highly accurate time and frequency synchronization. Traditionally, when an application needs highly accurate time and frequency synchronization, the application that uses a remote device within a satellite network utilizes an individual GPS receiver to synchronize time and frequency to a common master clock (e.g. cellular backhaul or industrial automation). Oftentimes, however, many applications that use many remote devices need highly accurate time and frequency synchronization within a satellite network. As a result, when applications are connected to different remote devices within traditional satellite network, each application may require an individual GPS receiver in order to synchronize time and frequency.

SUMMARY OF THE INVENTION

According to some embodiments, a hub device for performing time synchronization in a satellite network is provided, the satellite network including the hub device, a remote device and a satellite, the hub device comprising a hub real time clock (RTC) counter that is time synchronized to a master clock, a hub network clock reference (NCR) counter that is continuously driven by a hub clock oscillator having a relatively high precision, processing circuitry that periodically generates a time packet, the time packet including a hub RTC value of the hub RTC counter and a hub NCR value of the hub NCR counter, and a transmitter that transmits, via the satellite, the generated time packet to the remote device to synchronize a remote RTC counter with the hub RTC counter based on the hub RTC value and the hub NCR value in the generated time packet.

According to some embodiments, the remote device extracts the hub RTC value and the hub NCR value from the transmitted time packet, compares contents of the transmitted time packet with contents of a previously transmitted time packet, and adjusts the remote RTC counter based on the result of the comparison to synchronize the remote RTC value at the remote with the hub RTC value.

According to some embodiments, the remote RTC counter and the remote NCR counter are each driven by clock signals derived from a same remote clock oscillator having a relatively low precision, and the remote device synchronizes the remote RTC counter with the hub RTC counter to correct the remote RTC counter due to variations in the driving clock signals derived from the remote clock oscillator having the relatively low precision.

According to some embodiments, the remote device calculates a hub period NCR value that is a difference between the hub NCR value of a currently transmitted time packet and a hub NCR value of a previously transmitted time packet, calculates an adjustment time, the adjustment time being a proportion of a difference between a remote period NCR value and the hub period NCR value, and adjusts the remote RTC counter by the adjustment time.

According to some embodiments, the hub RTC counter is time synchronized to the master clock according to precision time protocol (PTP), the hub RTC counter performs a function of a PTP slave clock, and the master clock performs a function of a PTP grandmaster clock.

According to some embodiments, the hub device further comprises a line card that includes the RTC counter, the NCR counter and the transmitter.

According to some embodiments, the processing circuitry further generates a baseband frame (BBFRAME), and encapsulates the time packet in the baseband frame, and the transmitter transmits the time packet within the BBFRAME to the remote device.

According to some embodiments, a remote device that performs time synchronization with a hub device in a satellite network is provided, the satellite network including the remote device, the hub device and a satellite, the remote device comprising a remote clock oscillator with a relatively low precision, a receiver that receives time packets transmitted periodically from the hub device via the satellite, each time packet including a hub real time clock (RTC) value and a hub network clock reference (NCR) value, the hub RTC value representing a value of a hub RTC counter in the hub at a time when the time packet was transmitted to the remote device, the hub NCR value representing a value of a hub NCR counter in the hub at the time when the time packet was transmitted to the remote device, and the hub NCR counter is continuously driven by a hub oscillator having a relatively high precision, a remote RTC counter that represents a remote RTC value at the remote, a remote NCR counter that represents a remote NCR value at the remote, the remote RTC counter and the remote NCR counter are each driven by clock signals derived from the remote clock oscillator, and processing circuitry.

According to some embodiments, the processing circuitry extracts the hub RTC value and the hub NCR value from a current time packet, compares contents of the current time packet with contents of a previously received time packet, and adjusts the remote RTC counter based on the result of the comparison to synchronize the remote RTC value at the remote with the hub RTC value.

According to some embodiments, the processing circuitry further calculates an increment period for the remote RTC counter based on the clock signals derived from the remote clock oscillator, and increments the remote RTC counter every increment period.

According to some embodiments, the processing circuitry latches the remote NCR value of the remote NCR counter and the remote RTC value of the remote RTC counter when the receiver receives the current time packet.

According to some embodiments, the processing circuitry further calculates a hub period NCR value, the hub period NCR value being a difference between a current hub NCR value of a currently received time packet and a previous hub NCR value of a previously received time packet, calculates a remote period NCR value, the remote period NCR value being a difference between a current remote NCR counter value when the receiver receives the currently received time packet and a previous remote NCR counter value when the receiver received the previously received time packet, calculates an adjustment time, the adjustment time being a proportion of a difference between the remote period NCR value and the hub period NCR value, and adjusts the remote RTC counter by the adjustment time.

According to some embodiments, the processing circuitry further sets the remote RTC counter to the hub RTC value when a difference between the remote RTC counter and the hub RTC value is greater than a predetermined threshold.

According to some embodiments, the processing circuitry further calculates a hub period NCR value, the hub period NCR value being a difference between a current hub NCR value of a currently received time packet and a previous hub NCR value of a previously received time packet, calculates a remote period NCR value, the remote period NCR value being a difference between a current remote NCR counter value when the receiver receives the currently received time packet and a previous remote NCR counter value when the receiver received the previously received time packet, derives an adjusted clock frequency $F_{sys}$ for the remote clock oscillator, where $$F_{sys} = (\text{remote period NCR value}/\text{hub period NCR value}) \times F_{nominal},$$

$F_{nominal}$ is a constant known frequency, and the increment period is inversely proportional to $F_{sys}$.

According to some embodiments, the remote device further comprises a switch, wherein a client device is connected to the remote device by the switch, and the client device synchronizes a client time clock with the remote RTC counter.

According to some embodiments, the remote RTC counter is time synchronized to the hub RTC counter of the hub device according to precision time protocol (PTP), the remote RTC counter performs a function of a PTP master clock, and the hub RTC counter performs a function of a PTP clock.

According to some embodiments, the remote device further comprises a switch, wherein a client device is connected to the remote device by the switch, and the client device synchronizes a client PTP slave clock with the PTP master clock.

According to some embodiments, the processing circuitry further calculates the adjustment time according to the following equation (remote period NCR value–hub period NCR value)/R, where R is a ratio between the frequency $F_{sys}$ and a frequency of clock signals supplied to the remote RTC counter.

According to some embodiments, the remote device further comprises a line card that includes the remote RTC counter, the remote NCR counter and the receiver.

According to some embodiments, the remote device further comprises an antenna, wherein the receiver of the line card receives the time packet via the antenna.

According to some embodiments, a system for time synchronization in a satellite network is provided, the system comprising a hub device that includes a hub real time clock (RTC) counter that is time synchronized to a master clock, a hub network clock reference (NCR) counter that is continuously driven by a hub clock oscillator having a relatively high precision, processing circuitry that periodically generates a time packet, the time packet including a hub RTC value of the hub RTC counter and a hub NCR value of the hub NCR counter, and a transmitter that transmits, via a satellite, the generated time packet to a remote device. The system further comprises the remote device that includes a remote clock oscillator with a relatively low precision, a receiver that receives the periodically generated time packets from the hub device via the satellite, a remote RTC counter that represents a remote RTC value at the remote, a remote NCR counter that represents a remote NCR value at the remote, the remote RTC counter and the remote NCR counter are each driven by clock signals derived from the remote clock oscillator, and processing circuitry that extracts the hub RTC value and the hub NCR value from a current time packet received by the receiver, compares contents of the current time packet with contents of a previously received time packet, and adjusts the remote RTC counter based on the result of the comparison to synchronize the remote RTC value at the remote with the hub RTC value.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and their example depictions do not in any way limit the scope of the present advancements embraced by the specification. The scope of the present advancements embraced by the specification and drawings are defined by words of the accompanying claims.

DETAILED DESCRIPTION OF THE PREFERRED EMBODIMENTS

Figure 1:
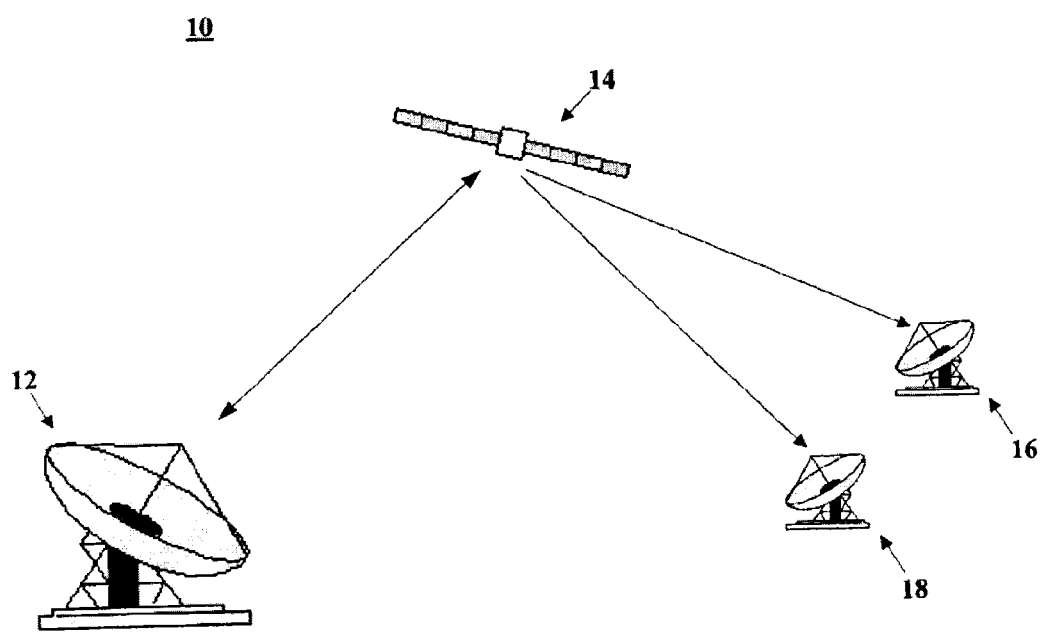
FIG. 1 illustrates an exemplary satellite network.

Referring now to the drawings, wherein like reference numerals designate identical or corresponding parts throughout the several views.

A satellite communication network may utilize a time division multiple access (TDMA) topology. In this arrangement, there is a hub device (i.e., the "central station") and one or more remote devices. Each of the one or more remote devices may transmit messages to and from the hub device via a satellite in earth orbit.

A satellite network configured in such a topology may have multiple continuous carrier signals transmitted from the hub to the satellite. The satellite repeats the carrier signal for reception by all of the remote devices. A hub device may support multiple such carriers, but a given remote device may only listen to a subset (e.g., one or two) of such carriers. Transmissions from the hub device to the remote devices are referred to as "outbound" and transmissions from the remote devices to the hub device are referred to as "inbound."

FIG. 1 illustrates an exemplary implementation of a satellite network. Satellite network 10 includes hub device 12, satellite 14 and remote devices 16 and 18. Hub device 12 and remote devices 16 and 18 may each be geographically located great distances apart. A TDMA plan may be implemented to provide a selection of carriers with different traffic-bearing capacities (e.g., different signal encodings, signal strength, signal frequencies, etc. . . . ) and levels of protection against adverse channel conditions. The characteristics of this plan may be broadcast from hub device 12 to remote devices 16 and 18 as control information.

Remote devices 16 and 18 may determine their instantaneous needs for transmission capacity and communicate these to hub device 12. In turn, hub device 12 grants the remote devices 16 and 18 such capacity. As an example, the interval is commonly referred to as a TDMA frame. The method used for this operation takes into account differences in traffic or user priorities, fairness rules and many other criteria.

Hub device 12 may include an antenna to communicate with remote devices 16 and 18 over a transmission channel via satellite 14. According to some embodiments, hub device 12 may assess the condition of the transmission channel from each remote device, by monitoring a quality of signals received and processing the results. Further, hub device 12 may determine appropriate transmission parameters. Hub device 12 may adjust to short-term variations in the capacity demand and channel conditions of individual remote devices by assigning the remote devices 16 and 18 time slots on carriers that have properties commensurate with their instantaneous needs and capabilities.

Hub device 12 may also include a modem to convert analog signals into digital data, and to convert digital data into analog signals. The analog signals are transmitted to, and received from, satellite 14. The modem may be integrated into other hardware, and transmit and receive functions of the modem may be split into separate functional blocks.

On a longer time scale, hub device 12 may adjust the carrier plan periodically to match prevailing conditions considered over the total population of remote devices. These adjustments may be made to ensure the best overall statistical match between the capacity requested by remote devices and the capacity and level of protection offered by the satellite network. A mismatch between the offered and demanded types of capacity and levels of protection can lead to inefficient use of the available bandwidth.

An example of a mismatch includes when the amount of capacity available with certain levels of protection is larger than needed. In such a case, satellite network 10 may not be able to make use of the excess capacity. Therefore, in this situation, some capacity may be wasted. Another example of a mismatch includes when the amount of capacity available with certain levels of protection is smaller than needed. In this case, the demands may not all be satisfied. Therefore, in this situation, some remote devices may suffer degradation in quality of service.

An adaptive TDMA system may also include a number of sets of pre-defined carrier frequency plans. Each set may contain a number of individual carrier plans. The sets and their constituent plans may be assessed periodically in order to determine the best choice. Each set of carrier plans may be optimised for a particular composition of a remote device population, such that each set is designed for a given assumption about the number of active remote devices of different types and with different technical characteristics. Alternatively, each set may contain a number of individual carrier plans, where each carrier plan is optimised for particular large-scale channel conditions, given the assumption about the terminal population that defines the set to which the plan belongs.

Further, a determination of the best carrier plan to use at any time may be performed in two stages. In a first stage, the best set of carrier plans is chosen based on the composition of the terminal population. In a second stage, the best member of the set is chosen based on actual usage patterns and prevailing link conditions.

Bandwidth efficiency may be increased by reducing the flooding of packets in L2 communication of messages transmitted between the hub device and the remote devices via the satellite within a satellite communication network.

However, to ensure communication between hub device 12 and remote devices 16 and 18 via satellite 14, periodic time and frequency synchronization is necessary. In an exemplary implementation of the present embodiment, a hub device may provide time and synchronization information for a plurality of remote devices.

In the present embodiment, modification of the TDMA satellite network is not required to synchronize a remote device, as the precision time protocol (PTP) time synchronization does not take place over the air (OTA). This also makes the performance of the time synchronization independent from packet delay variation (PDV), time slot allotment, and allocation of the bursts in the TDMA network.

A method based on network clock reference (NCR) is used to transfer the time and frequency information from the hub to remotes. This delivers the GPS time to a network with high accuracy as the NCR is successfully phase/frequency aligned in remotes.

For two way links, as illustrated in FIG. 3, the accurate measurement of the round trip delay required for TDMA bursts can be used to precisely align the PTP master on the remote terminal with the master clock at the hub.

Using this topology, a GPS receiver may support a plurality of remote devices. In contrast, known topologies require that each remote device have a GPS receiver. Topologies of the present embodiment have no additional inaccuracy for mobile stations, i.e., remote device, as any Doppler frequency shift effect is compensated for in time and frequency synchronization processes performed at the remote device.

Figure 2A:
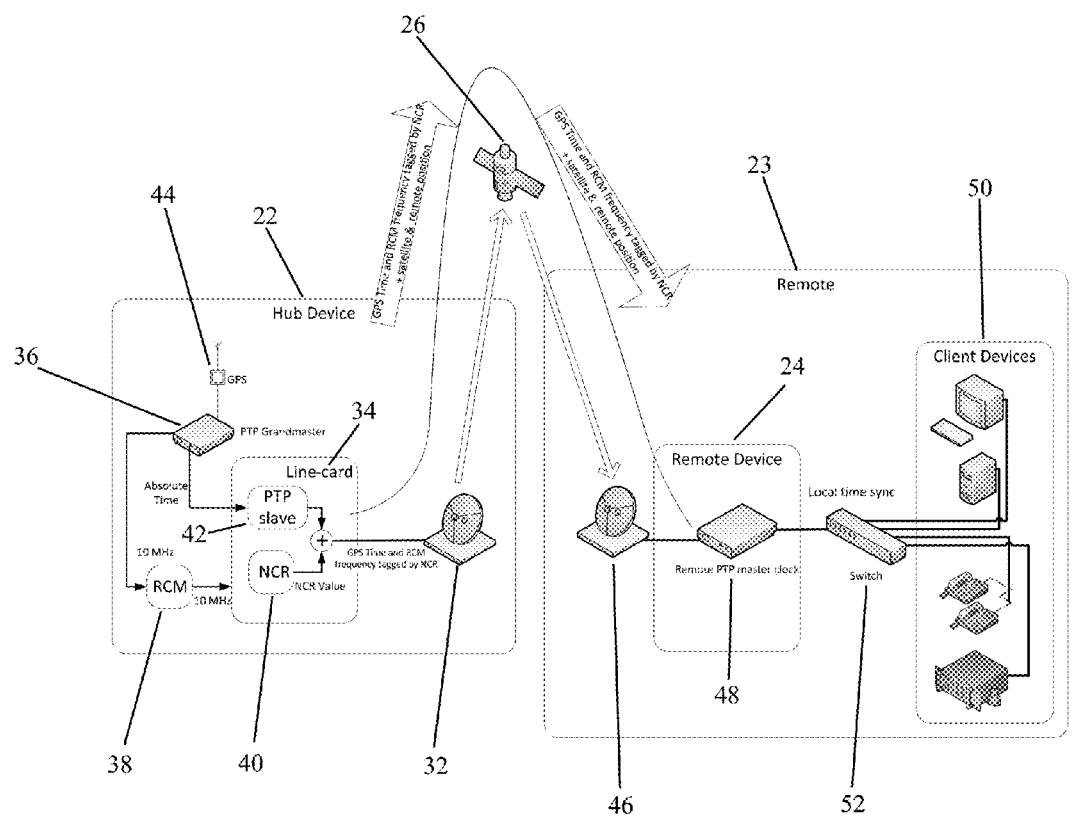
FIG. 2(A) illustrates an exemplary time synchronization topology for a point-to-point connection to an external PTP Grand-master in a one-way satellite communication link.
Figure 2B:
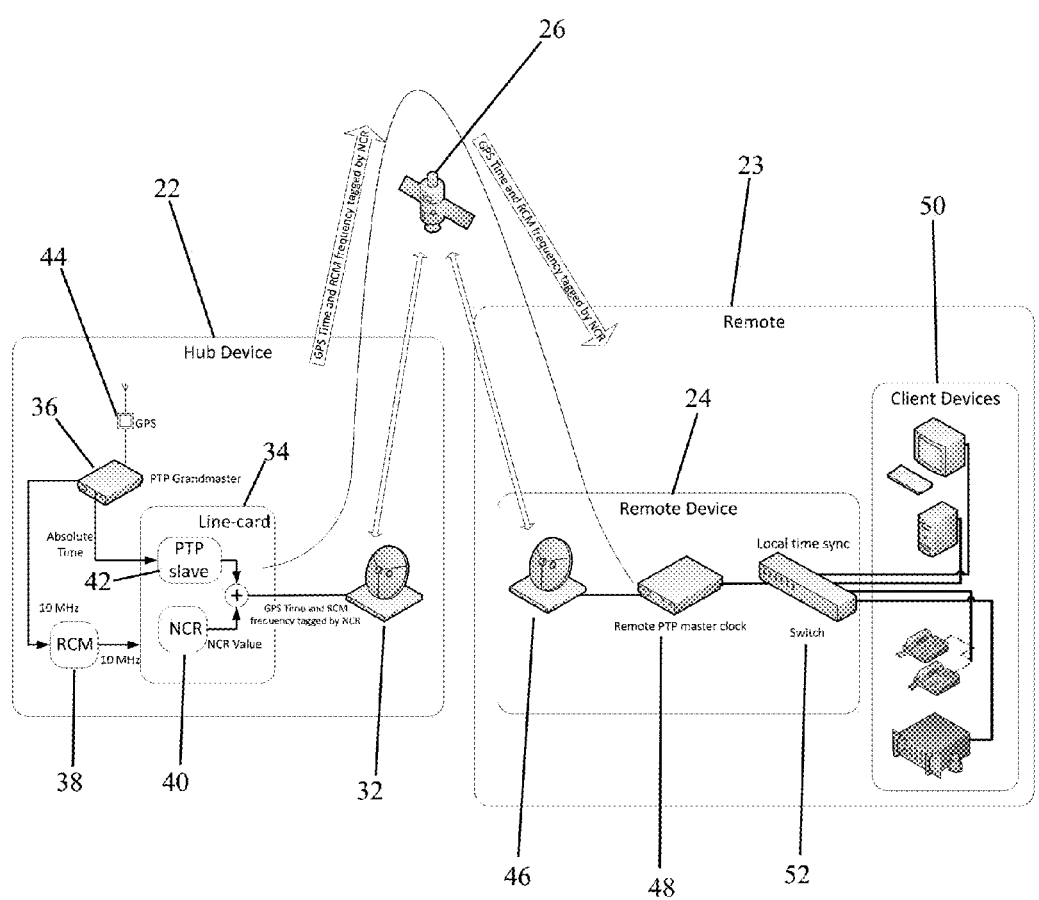
FIG. 2(B) illustrates an exemplary time synchronization topology for a point-to-point connection to an external PTP Grand-master in a two-way satellite communication link.
Figure 2C:
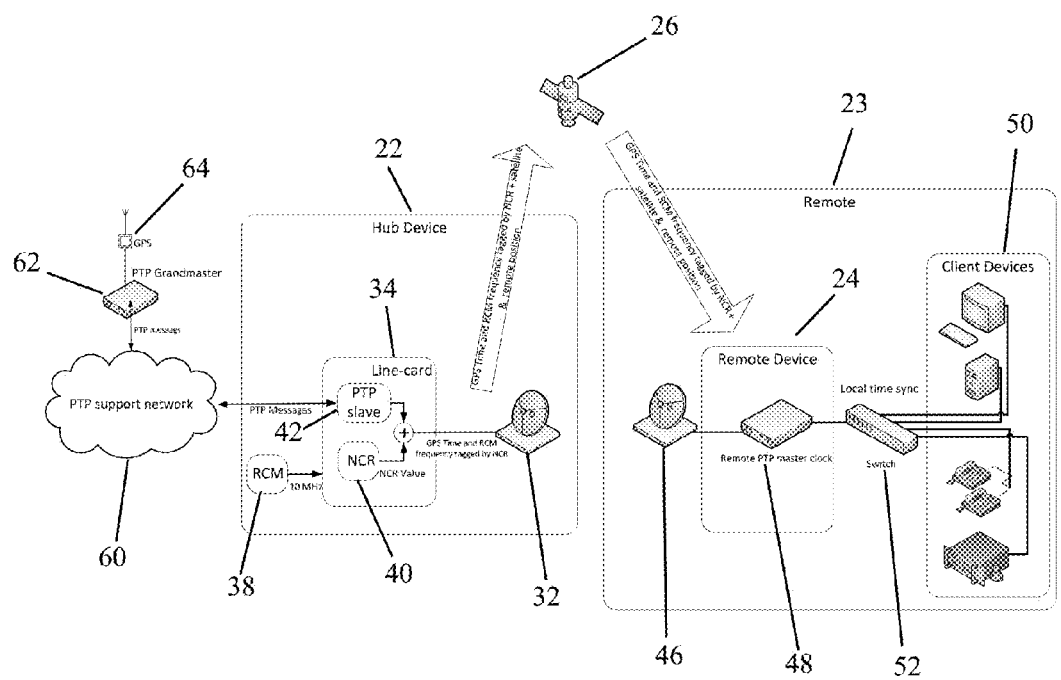
FIG. 2(C) illustrates an exemplary time synchronization topology that includes a network connection to an external PTP Grand-master.

FIGS. 2(A)-2(C) illustrate exemplary time synchronization topologies to provide time and synchronization information for a plurality of client devices within a client network.

The topologies illustrated in FIGS. 2(A)-2(C) allow for the synchronization of customer networks and devices to a master time and frequency at a hub device. Such topologies involve route connecting a line-card at the hub device to a remote device at the remote end.

The topologies may employ the IEEE 1588-2008 standard PTP at each end (the hub device and remote device ends). However, PTP is not established OTA. PTP requires constant propagation times in both directions of a link. As a result, it is oftentimes difficult to guarantee time and frequency synchronization in a TDMA system without the imposition of tight constraints on time slot allocation. The topologies illustrated in FIGS. 2(A)-2(C) allow for PTP time synchronization in TDMA networks without restrictions on time slot allocation.

FIG. 2(A) illustrates an exemplary time synchronization topology for a point-to-point connection to an external PTP Grand-master in a one-way satellite communication link. In particular, FIG. 2(A) illustrates hub device 22, remote 23 and satellite 26. Hub device 22 includes line-card 34, PTP grandmaster clock 36 and reference clock module (RCM) 38. Line-card 34 may include a transmitter.

Hub device 22 may further include antenna 32, at least one processor, at least one memory, and at least one field programmable gate array (FPGA). Further, in exemplary implementations, hub device 22 may comprise a plurality of line-cards 34.

The transmitter of line-card 34 transmits to client 24 via antenna 32 and satellite 26. Line-card 34 includes PTP slave clock 42 and network clock reference (NCR) 40. In exemplary implementations, NCR may be utilized under ETSI EN 301 790 (DVB-RCS).

In exemplary implementations, hub device 22 may be a network, multiple networks, or one network within a star network topology. In other exemplary implementations, hub device 22 includes any of a protocol processor, processing circuitry, line-cards, and a network management system (NMS). Line-card 34 performs physical layer communication for hub device 22. In exemplary implementations, antenna 32 may be a component of line-card 34.

Line-card 34 communicates with PTP grand-master clock 36 to synchronize PTP slave clock 42 to the GPS time and frequency of PTP grand-master clock 36. Line-card 34 may communicate with PTP grand-master clock 36 via a wired or a wireless connection, such as Ethernet. In exemplary implementations, PTP slave clock 42 of line-card 34 may communicate with PTP grand-master clock 36 for time and frequency synchronization.

The communication between PTP slave clock 42 (or line-card 34) and PTP grand-master clock 36 may be based on IEEE 1588 standard. PTP slave clock 42 and PTP grand-master clock 36 send and receive messages defined in the standard. In exemplary implementations, the messages between PTP slave clock 42 and PTP grand-master clock 36 may be synch, follow-up, delay request, delay response, announce, management or any other type of message information.

In exemplary implementations, PTP grand-master clock 36 includes GPS receiver 44. GPS receiver 44 provides global positioning data and a highly accurate time reference for PTP grand-master clock 36. Further, PTP grand-master clock 36 may include any of highly accurate crystal oscillators, microprocessors, FPGAs, memory and Ethernet ports. PTP grand-master clock 36 may communicate with PTP slave clock 42 via a direct connection, illustrated in FIGS. 2(A) and 2(B), and/or via a network connection illustrated in FIG. 2(C). In other words, PTP grand-master clock 36 may be located within hub device 22, i.e. as a component of hub device 22 as in FIGS. 2(A) and 2(B), or separate and distinct from hub device 22, as illustrated in FIG. 2(C).

FIG. 2(A) illustrates that remote device 24 includes PTP master clock 48, one or more client devices 50, and switch 52. To synchronize time and frequency from hub device 22 to remote 23, line-card 34 transmits time and frequency information to remote 23 via antenna 32 and satellite 26. In an exemplary implementation, remote device 24 receives time information in the form of a time packet from line-card 34 via antenna 32 and satellite 26. To receive the time packet, remote 23 may include antenna 46. Time packets will be discussed below with respect to FIGS. 3(A), 3(B), and 4.

In exemplary implementations, remote device 24 may be a line-card similar to line-card 34. In FIG. 2(A), remote device 24 includes a receiver. Remote device 24 may further include at least one processor, at least one memory, and at least one field programmable gate array (FPGA). In exemplary implementations, remote device 24 may comprise a plurality of line-cards. Further, the line-card of remote device 24 may be a network, multiple networks, or one network within a star network topology. In other exemplary implementations, remote device 24 includes any of a protocol processor, processing circuitry, line-cards, and a network management system (NMS). Remote device 24 may perform physical layer communication.

PTP master clock 48 of client 24 adjusts a local time based on the received time packet. The processes of remote device 24 will be discussed later with respect to FIGS. 5 and 6. After synchronization, PTP master clock 48 of remote device 24 may perform time and frequency synchronization with client devices 50 via switch 52 according to the adjusted local time. In other words, client devices 50 may be synchronized to a local time that was adjusted based on the received time packet from hub device 22.

FIGS. 2(A)-2(C) illustrate that remote 23 includes remote device 24, antenna 46, switch 52 and client devices 50. While FIGS. 2(A) and 2(C) illustrate that antenna 46 and switch 52 are separate from remote device 24, they do not have to be. For example, FIG. 2(B) illustrates an exemplary implementation of remote device 24 that includes antenna 46 and switch 52.

The time synchronization topology illustrated in FIG. 2(B) is a same topology as the topology illustrated in FIG. 2(A), except that communication may be transmitted and received by both hub device 22 and remote device 24 via satellite 26 over a two-way satellite communication link. In particular, line-card 34 of hub device 22 may include a transceiver, and antenna 32 may transmit and receive communication to and from the transceiver via satellite 26. In remote 23, remote device 24 may include a transceiver, and antenna 46 may transmit and receive communication to and from the transceiver via satellite 26.

FIG. 2(C) illustrates an exemplary time synchronization topology that includes a network connection to an external PTP Grand-master 62. In particular, FIG. 2(C) differs from FIGS. 2(A) and 2(B) in that the PTP grand-master clock 62 is located external from hub device 22 and is connected to line-card 34 via PTP support network 60. GPS receiver 64 is connected to PTP grand-master clock 62. In exemplary implementations, PTP support network 60 may be a LAN, WAN, or any networks that support the transmission of messages in PTP protocol.

In FIGS. 2(A)-2(C), RCM 38 provides a highly accurate driving frequency to line-card 34. The driving frequency provided by RCM 38 is modified at line-card 34, and each of NCR counter 40 and PTP slave clock 42 of line-card 34 are driven by a separate modified driving frequency. In exemplary implementations, for example, the driving frequency provided by RCM 38 may be at 10 MHz. At line-card 34, the driving frequency may be amplified to 100 MHz to drive PTP slave clock 42, and may be amplified to 27 MHz to drive NCR counter 40. However, another driving frequency may be provided by RCM 38, and NCR counter 40 and PTP slave clock 42 may be driven at other driving frequencies.

In exemplary implementations, RCM 38 may be provided with highly accurate time and frequency information from PTP grand-master clock 36. As a result, the driving frequency provided by RCM 38 to line-card 34 may be stable and accurate. Further, line-card 34 may be supplied with a pulse per second (PPS) input from PTP grand-master clock 36 instead of clock reference information. In this case, the driving frequency supplied from RCM 38 may be internally calculated within line-card 34 from the PPS supplied from PTP grand-master clock 36.

After PTP synchronization between PTP slave clock 42 and PTP grand-master clock 36, line-card 34 is considered phase and frequency locked to the GPS time of PTP grand-master clock 36. In other words, the RTC counter value of PTP slave clock 42 is locked to the clock time of PTP grand-master clock 36. Moreover, the NCR counter value of NCR counter 40 is locked to the clock time of PTP grand-master clock 36, as NCR counter 40 is driven by RCM 38 which was supplied with time and frequency information from PTP grand-master clock 36.

Line-card 34 may ensure that the RTC counter of PTP slave clock 42 is locked to the clock time of PTP grand-master clock 36 by determining whether the RTC counter value of the RTC counter of PTP slave clock 42 is within a predetermined threshold of the clock time of PTP grand-master clock 36. Further, line-card 34 may also ensure that the NCR counter value of NCR 40 within a predetermined threshold of the accurate frequency provided by RCM 38.

Next, line-card 34 latches the RTC counter value and the NCR counter value into memory.

Discussion will now turn to the generation of time packets. To transmit the time and frequency information, line-card 34 encapsulates the RTC counter value of PTP slave clock 42 and the NCR counter value of NCR counter 40 into a single packet via an encapsulation scheme such as LEGS. In an exemplary implementation, the RTC counter value of PTP slave clock 42 and the NCR counter value of NCR counter 40 are encapsulated within a time packet. The time packet is then encapsulated into a baseband frame (BBFRAME) and transmitted OTA. BBFRAME is specified in ETSI EN 302 307.

Figures 3A, 3B:
FIG. 3(A) illustrates an exemplary time packet.
FIG. 3(B) illustrates an exemplary baseband frame that includes an NCR packet and a time packet.

An exemplary time packet is illustrated in FIG. 3(A). FIG. 3(B) illustrates an exemplary baseband frame (BBFRAME) that includes a time packet.

FIG. 3(A) illustrates an exemplary time packet. A payload includes information (bits) that is going to be transfer. For a time packet, a payload includes RTC time-stamp and RCM frequency. A protocol type determines the type of the packet i.e. RTC or NCR. SEL determines the type of LEGS packet and the state of the current fragment.

A time packet may be inserted periodically into the BBFRAME by the firmware. The firmware is implemented in an FPGA. The FPGA includes thousands of programmable gates and micro-processors. The micro-processors run the software. The protocol field in the header identifies the packet as the RTC. The payload of a time packet has 144 bits, 42 bits for the NCR value, 22 bits for the future use, 80 bits for the time-stamp, and 64 bits for RCM frequency. The time portion of the time packet, which is based on the standard UNIX time-stamp, is further divided into two portions, 48 bits for second and 32 bit for nanosecond (ranging from 0 to 999999999).

Because the NCR clock generated by the line card is locked to a reference frequency from the GPS, i.e., 10 MHz, the relationship between NCR clock time and GPS time is fixed. As a result, the message sent to advertise the relationship between GPS time and the NCR clock time may be sent infrequently without a loss of accuracy. This allows OTA bandwidth usage to be extremely low.

FIG. 3(B) illustrates an exemplary location of a time packet in a BBFRAME. BBFRAME (baseband frame) is the capsule carry information. A BBFRAME includes several packets of data. For example, each BBFRAME has a header (HDR) that includes information about the length and type of the BBFRAME. Also included in the BBRAME is the time packet, which includes the hub NCR counter value and the hub RTC counter value. CRC is cyclic redundancy check used to detect errors might be happened in a BBFRAME. Typical BBFRAMEs range in size from 3072 to 58192 bits.

Each HRD is 10 bytes, each NCR value slot may be of variable length, each RTC value slot is 22 bytes and each CRC is 4 bytes. Empty dummy NCR value slots and RTC value slots, HDR and CRC are created by software. The RTC counter value and the NCR counter value of the time packet are inserted into the BBFRAME by the firmware. In other words, the data values, time and frequency information, and the hub NCR counter value and the hub RTC counter value are inserted by the firmware. For example, the software creates the packets and the firmware fills the packets with their real values. The RTC time is latched when a DVB-S2 PL SOF strobe happens. The TX-DVBS2 line-card periodically inserts the time packet, including the NCR and RTC counter values into the BBFRAME (currently every 31.25 ms).

In exemplary implementations, time packets may be generated by software at the hub and inserted into a BBFRAME by the firmware of the line-card. In particular, the latched RTC time along with its corresponding NCR value is inserted into the time packet. The packet may be organized in a variety of ways. Significantly, the time packet is utilized to transfer the RTC time from the hub to the client.

The protocol field=0x00F0 in the header identifies the packet as the RTC. The payload of a time packet has 144 bits, 42 bits for the NCR value, 22 bits for the future use, 80 bits for the time-stamp, and 64 bits for RCM frequency. The time portion of the time packet, which is based on the standard UNIX time-stamp, is further divided into two portions, 48 bits for second and 32 bit for nanosecond.

It may be necessary to tag the RTC value with its corresponding NCR value in order to compensate the variable path delay between the line-card of the hub device and the remote device. Similar to the NCR value, the RTC value may be latched when the start of frame (SOF) strobe is inserted by the modulator. The latched RTC time along with its corresponding NCR value is inserted into the time packet.

At remote 23, remote device 24 may receive the time packets periodically. As the synchronization to the PTP grand-master clock is done according to time and frequency values of the time packet, any time delays caused by the movement of either the satellite or the remote device with respect to the hub device may be compensated for. That is, the time information provided in the time packet will allow a remote device to reconstruct the RTC value and the NCR value of the hub device. As a result, the remote device does not require an accurate clock reference, the remote device may utilize a low-precision oscillator, at the remote side to reconstruct the same frequency information that on the hub side.

Moreover, the PTP master clock of the remote device may correct for variations caused the low-precision oscillator that provides the clock signals to drive the remote RTC counter, as well any Doppler shift frequency and path delay variations due to movement of the satellite or the remote device. In an exemplary implementation, time adjustments according to uplink protocol information (UCP) information may be calculated based on the arrival timing of TDMA burst back from the remote device, as described in detail in U.S. Pat. No. 8,068,448, which is hereby incorporated in its entirety.

The time adjustments performed at the PTP master clock of the remote device technology could be used in one-way links (receive-only remotes) if the position of the satellite as a function of time is known and can be periodically sent on the one way link. Alternatively, the periodic adjustment to phase and frequency variations due to movement of the satellite may be accomplished by transmitting information relating to the satellite position.

The same method may also be used by one way remotes without precise satellite information, although this would be at the expense of absolute accuracy errors in the time on the remote side because of unknown changes in the signal path length. In this mode, the differential error between nearby sites would remain very small, whether or not the remote terminal position was known accurately. This may be sufficient in situations where precise absolute time is less important than relative time synchronization between nearby sites.

Once the RTC is initialized with the GPS time, the PTP Master clock of the remote is ready to synchronize the time in the clients' networks (devices). To improve the time synchronization accuracy, both the PTP Master clock on the remote and the PTP Slave clock on the line-card may use hardware-based time-stamping in the Ethernet MAC.

Figure 4:
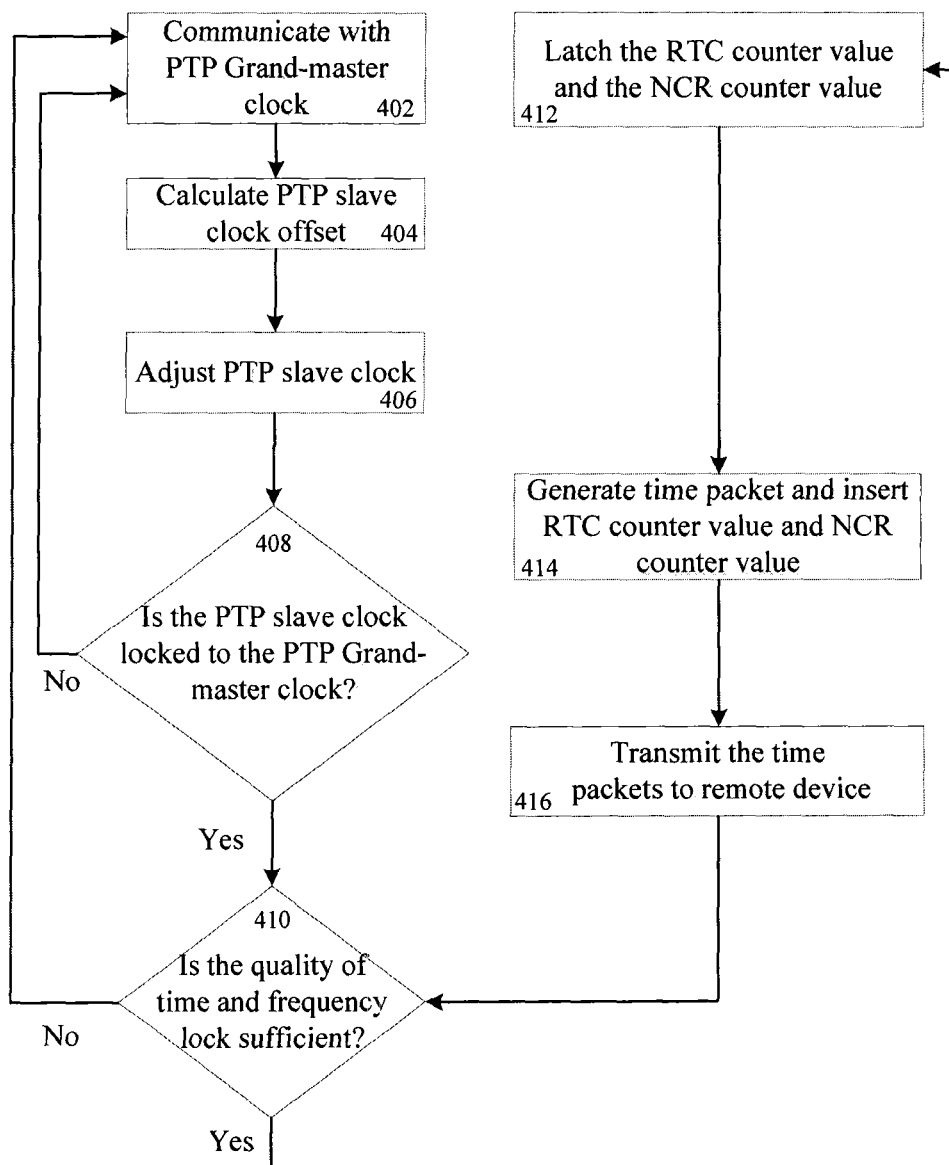
FIG. 4 illustrates an exemplary process for time synchronization performed by a hub device in a satellite network.

FIG. 4 illustrates an exemplary method for time synchronization performed by a hub device in a satellite network. For example, the method illustrated in FIG. 4 may be performed by hub device 22, as illustrated in FIGS. 2(A)-2(C).

The hub begins in step 402, wherein line-card 34 communicates with the PTP grand-master clock. For example, line-card 34 may request to synchronize with the PTP grand-master clock. Line-card 34 may then receive time and frequency values from PTP grand-master clock for synchronization.

In step 404, line-card 34 calculates clock offset and drift values. In particular, line-card 34 calculates a clock offset value between PTP grand-master clock and the RTC value. Further, line-card 34 calculates a drift value of the RTC value compared to the PTP grand-master clock. Alternatively, the calculations of step 404 may be performed by a processor or other circuitry included of hub device 22.

In step 406, line-card 34 adjusts the RTC counter of PTP slave clock 42. In step 408, hub device 22 determines whether the RTC counter of PTP slave clock 42 is locked to the PTP grand-master clock. If hub device 22 determines that the RTC counter of PTP slave clock 42 is not locked to the PTP grand-master clock, hub device 22 returns to step 402. Alternatively, if hub device 22 determines that the RTC counter of PTP slave clock 42 is locked to the PTP grand-master clock, hub device 22 proceeds to step 410. The determination of step 408 may be performed by, for example, line-card 34 or a processor other circuitry of hub device 22.

In step 410, hub device 22 determines whether a quality of the time and frequency lock to the PTP grand-master clock is sufficient. For example, hub device 22 may compare the time and frequency lock to a predetermined threshold value. If hub device 22 determines that the quality of the time and frequency lock is insufficient, hub device 22 returns to step 402. Alternatively, if hub device 22 determines that the quality of the time and frequency lock is sufficient, hub device 22 proceeds to step 412. The determination of step 410 may be performed by, for example, line-card 34 or a processor other circuitry of hub device 22.

In step 412, line-card 34 latches the RTC value (the time-stamp of local clock in PTP slave clock). In step 414, line-card 34 generates a time packet and inserts the RTC value. Finally, in step 416, hub device 22 transmits the time packet, within a BBFRAME, via the satellite. After step 416, hub device 22 returns to step 410.

Figure 5:
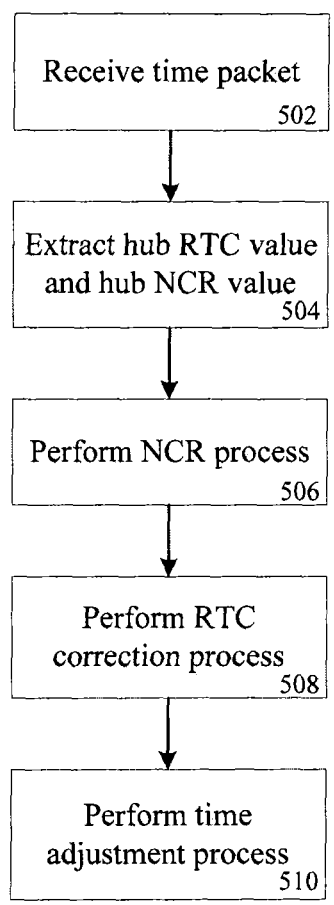
FIG. 5 illustrates an exemplary process for time synchronization performed by a remote device in a satellite network.
Figure 6:
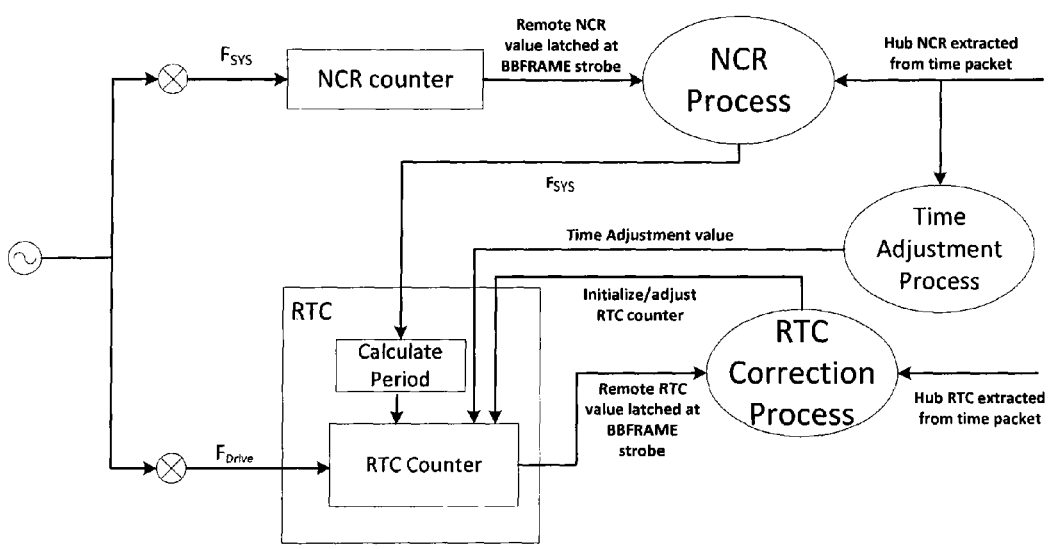
FIG. 6 illustrates a flowchart that includes the process for time synchronization of FIG. 5 that is performed by the remote device.

FIG. 5 illustrates an exemplary process for time synchronization performed by a remote device in a satellite network. FIG. 6 illustrates a flowchart that includes the process for time synchronization of FIG. 5 that is performed by the remote device.

In an exemplary implementation, the process illustrated in FIG. 5 and the flowchart illustrated in FIG. 6 may be performed by remote device 24, as illustrated in FIGS. 2(A)-2(C).

In step 502, remote device receives the time packet transmitted from hub device 22. Remote device 24 may receive the time packet via antenna 46. Further, at the time of reception of the time packet, remote device 24 may latch the remote RTC value of the remote RTC counter at the time of reception of the time packet and the remote NCR value of the remote NCR counter at the time of reception of the time packet into memory.

In step 504, remote device 24 extracts the hub RTC value and the hub NCR value from the received time packet. Remote device 24 may latch the hub RTC value and the hub NCR value from the received time packet into memory. FIG. 6 illustrates that the hub RTC value is utilized in the RTC correction process of step 508 and that the hub NCR value is utilized in the NCR process of step 506 and the time adjustment process of step 510.

In step 506, remote device 24 may perform the NCR process. The remote RTC counter is driven by a remote-clock oscillator having a relatively low precision compared to a clock oscillator that drives the hub RTC counter. Because the remote clock oscillator has a relatively low-precision, the remote RTC counter may need frequent adjustments, as the remote RTC counter may be incremented too fast or too slow. FIG. 6 illustrates that the NCR process utilizes the remote NCR value of the remote NCR counter that was latched into memory upon reception of the time packet (when the BBFRAME including the time packet is received).

In the NCR process, remote device 24 adjusts an increment period of the remote RTC counter. That is, remote device 24 calculates an increment period for the remote RTC counter based on the clock signals derived from the remote clock oscillator. The calculated increment period is used to increment the remote RTC counter, i.e. the remote RTC counter is incremented every increment period.

To calculate the increment period, remote device 24 has to derive an adjusted clock frequency $F_{sys}$. Adjusted clock frequency $F_{sys}$ is a modified clock frequency of the remote clock oscillator that provides the clock signal. Remote device 24 calculates clock frequency $F_{sys}$ as follows:

$F_{sys}$=(remote period NCR value/hub period NCR value)×$F_{nominal}$, where $F_{nominal}$ is a constant known frequency. The increment period is inversely proportional to $F_{sys}$.

To calculate $F_{sys}$, remote device further calculates a hub period NCR value and a remote period NCR value. The hub period NCR value being a difference between a current hub NCR value of a currently received time packet and a previous hub NCR value of a previously received time packet. The remote period NCR value being a difference between a current remote NCR counter value when the receiver receives the currently received time packet and a previous remote NCR counter value when the receiver received the previously received time packet.

FIG. 6 illustrates that the NCR process provides the derived $F_{sys}$ to the RTC counter for the calculation of the increment period.

In step 508, remote device 24 may perform the RTC correction process. In the RTC correction process, remote device 24 either (1) sets the remote RTC counter as the hub RTC value provided in the time packet, or (2) adjusts the remote RTC counter by a difference between the remote RTC counter and the hub RTC value.

In particular, remote device 24 performs (1) when a difference between a remote RTC value of the remote RTC counter and the hub RTC value is greater than a predetermined threshold. This may occur if the remote device 24 or the RTC counter was reset, the occurrence of a power failure, a large fluctuation in the clock signals provided by the remote oscillator, or some other event. As a result, the remote RTC counter is initialized at a value of the hub RTC value provided in the time packet.

Remote device 24 performs (2) when a difference between the remote RTC value of the remote RTC counter and the hub RTC value is less than a predetermined threshold. The difference between the remote RTC value of the remote RTC counter and the hub RTC value is less than a predetermined threshold when time and frequency variations are introduced into the remote RTC counter due to the clock signals provided by the remote oscillator and transmission path delay of the time packet.

FIG. 6 illustrates that the RTC correction process uses the remote RTC value, of the remote RTC counter, that is latched into memory upon the reception of the time packet in the BBFRAME and that the remote RTC counter is initialized/adjusted based on a result of the RTC process.

In step 510, remote device 24 may perform the time adjustment process. In particular, remote device 24 adjusts the remote RTC counter by a time adjustment that is equal to a proportion of a difference between a remote period NCR value and a hub period NCR value. In particular, remote device 24 calculates the time adjustment as follows:

$\Delta T_{Adjustment}$=(Period NCR$_{remote}$−Period NCR$_{hub}$)/R, where

R is a ratio between the frequency $F_{sys}$ and a frequency of clock signals supplied to the remote RTC counter ($F_{Drive}$ as illustrated in FIG. 6). The hub period NCR value and the remote period NCR value are differences between NCR values of successive time packets. The calculation of the hub period NCR value and the remote period NCR value is described above with respect to step 506.

FIG. 6 illustrates that the calculated time adjustment value, $\Delta T_{Adjustment}$, is used to adjust the remote RTC counter.

The time adjustment to the remote RTC counter performed by remote device 24 provides compensation for time delay caused by (1) differences between clock signals derived from a relatively low precision oscillator that drives the NCR counter and the RTC counter of the remote device and (2) any Doppler shift effect, a time adjustment may be periodically applied to the RTC counter.

In exemplary implementations of the process illustrated in FIG. 5, steps 506-510 may be performed concurrently, sequentially, intermittently, or any order. Further, any of steps 506-510 may be omitted during the execution of the process illustrated in FIG. 5. For example, remote device 24 may perform step 510, then remote device 24 may perform step 508 and omit step 506 in an execution of the process of FIG. 5.

Figure 7:
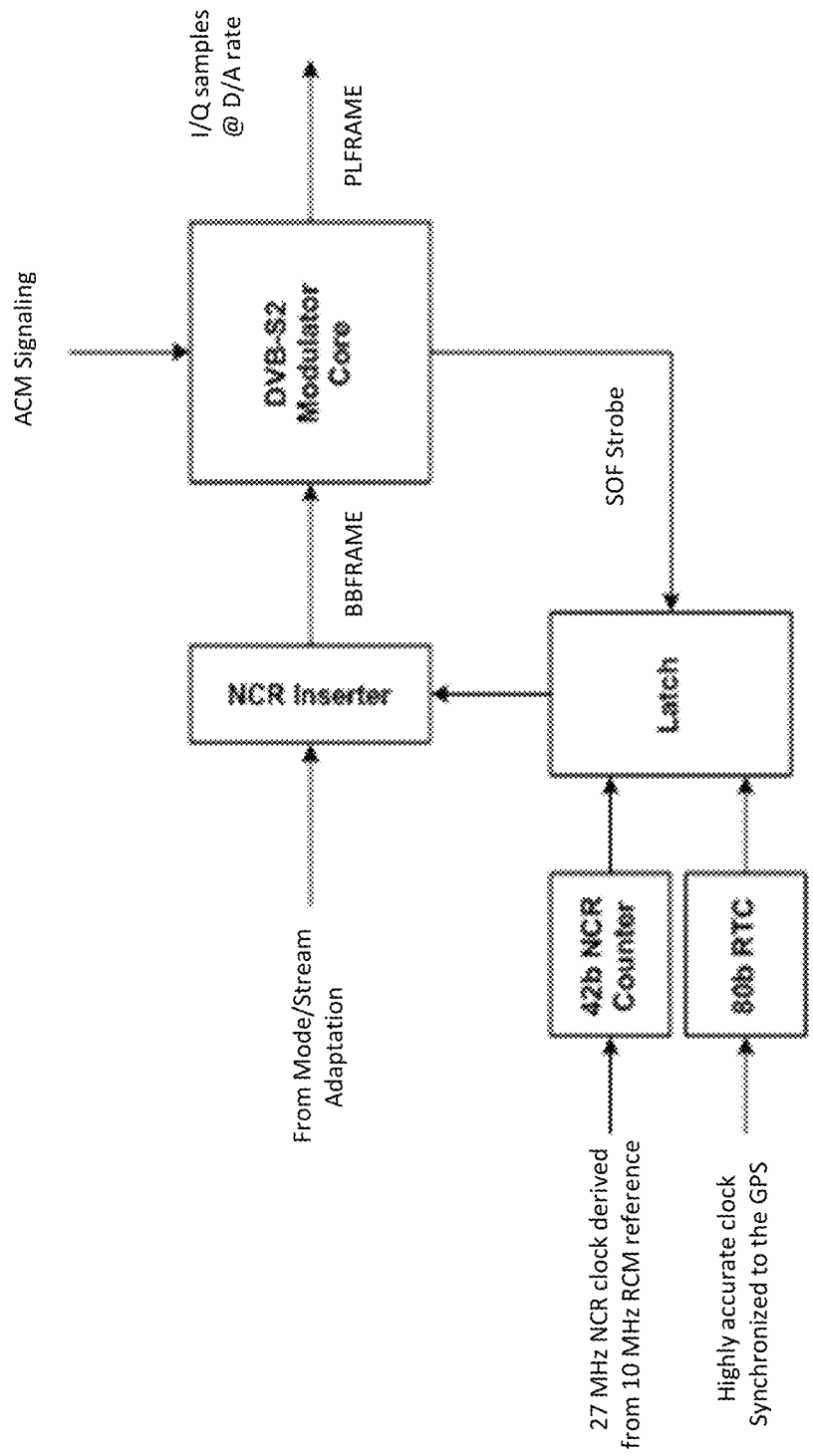
FIG. 7 illustrates exemplary time packet generation at a hub device.

FIG. 7 illustrates exemplary time packet generation. In particular, the NCR is a highly accurate counter like the RTC. As a result, the NCR and RTC values are latched together simultaneously. After latching of the NCR and RTC values, the NCR and RTC values are inserted into a BBFRAME by a firmware component of the line-card. In particular, the NCR inserter inserts the NCR and RTC latched values into the BBFRAME. Finally, the BBFRAME is modulated using a DVBS2 modulator for output to the transmitter for transmission over the air.

Figure 8:
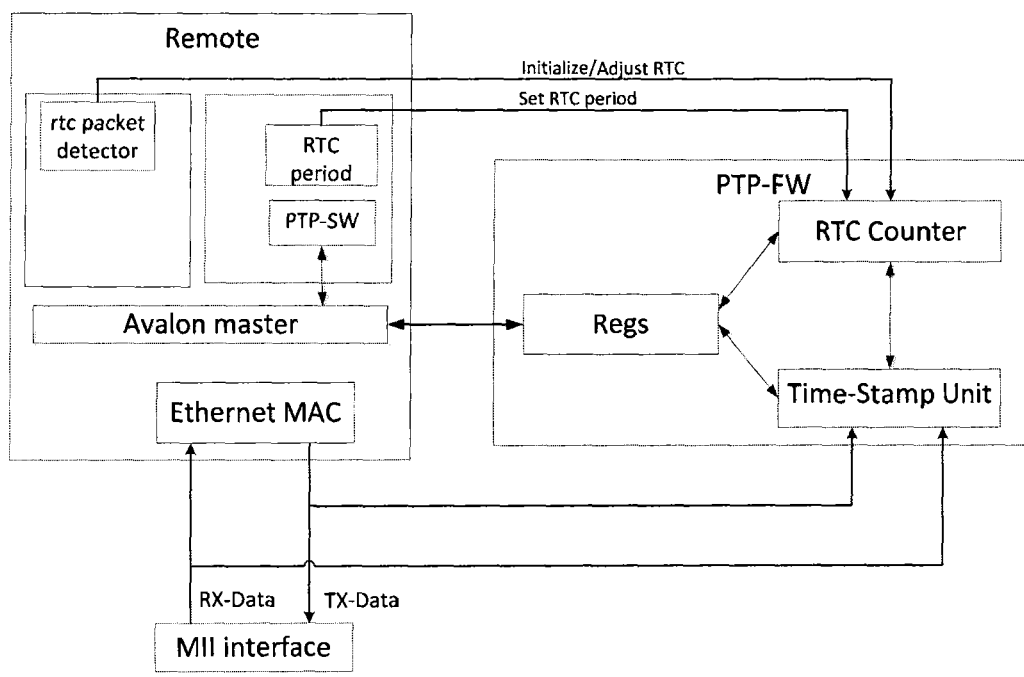
FIG. 8 illustrates an exemplary PTP design in device line-card or a remote device.

FIG. 8 illustrates an exemplary PTP design. In particular, FIG. 8 illustrates a PTP master clock implemented on a remote or a PTP slave clock implemented on a line-card. The PTP clock may be composed of two cores: firmware and software.

The firmware core performs time-stamping at the physical interface and provides the real time clock (RTC) with a fraction of a sub-nanosecond precision. The software core is responsible for the rest of tasks defined in the IEEE 1588-2008, such as generating event and general messages, message packing and unpacking, and calculating the clock drift. Additionally, two other cores may be incorporated to the software in order to support the PTP implementation: time packet detection and RTC period determination.

FIG. 8 further illustrates exemplary communications between firmware components of the PTP clock of the hub device line-card or the remote device line-care. Avalon master is an interface within embedded systems such as FPGAs. MII interface is a media independent interface, however, other media independent interfaces such as GMII may be used. Further, the firmware may execute time-sensitive tasks while the software may execute redundant non-time-sensitive tasks. To have the best performance, it is necessary to implement time-sensitive tasks in the firmware. The PTP-firmware has a time-stamp unit, an RTC, and some registers.

Figure 9:
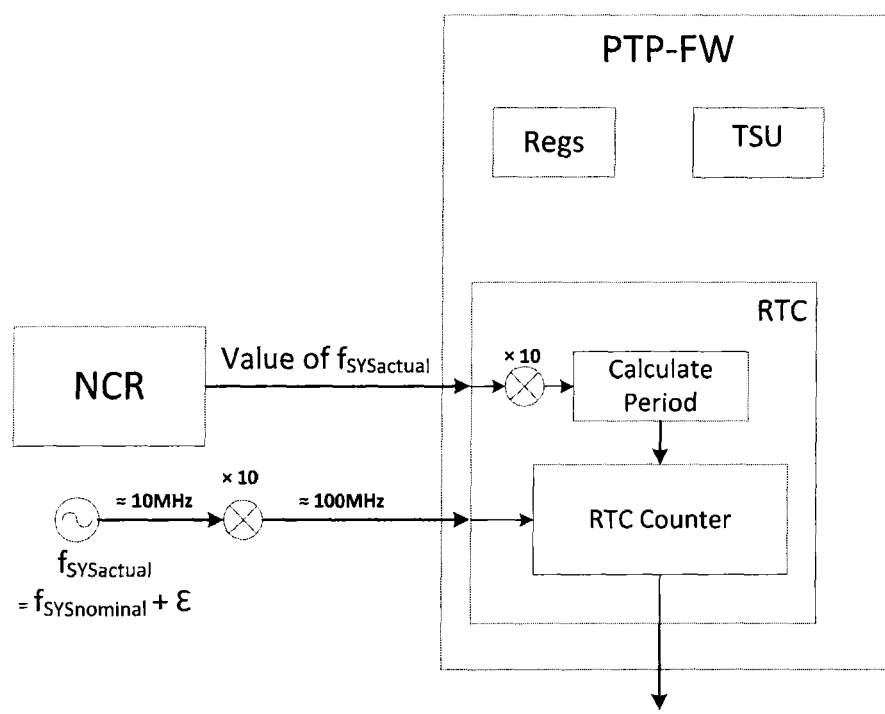
FIG. 9 illustrates exemplary connections between an RTC and an NCR.

FIG. 9 illustrates exemplary connections between an RTC and an NCR. The RTC may be supplied by a reference clock generated by a PLL, for example a 100 MHz clock. The RTC may be implemented using an FPGA. NCR is a counter which may also be implemented using an FPGA. The frequency of the source clock may deviate from an ideal value because of the nonlinearity in the PLL and the low-quality oscillator used in the remote. To compensate the frequency variations and provide fractions of nanosecond accuracy, RTC steps are calculated based on the actual frequency of the source clock and not a nominal one (100 MHz). To this end, the RTC periodically reads the value of the system clock that is calculated by the network clock reference (NCR) module.

The NCR may minimize the error $\epsilon$ (epsilon) of the system clock ($f_{SYSactual}=f_{SYSnominal}\pm\epsilon$). It also may compute the actual value of the system clock. The RTC uses the actual value to calculate the steps of its fractional counter and subsequently to generate highly accurate seconds and nanoseconds. For clarity, the process of translation of the system clock to the RTC period is explained through an example.

Assuming that $F_{SYS}$=10.000001 MHz, the frequency of the clock supplying the RTC counter would be 100.00001 MHz, and subsequently, the step of the counter (period) would be 9.9999990 ns. This means that the fractional counter will be added by 9.9999990 at each rising edge of the clock, and when the value of the nanoseconds counter is equal to $10^9$, it causes the second counter to be added by 1. The fractional counter specifies an inner loop involving 32-bit registers to keep the fractions of a nanosecond and to perform the summation operation, which causes accuracy about 0.000000000233 ns.

Additionally, Doppler frequency shift may introduce errors into the RTC counter. Although the hub device and the remote device may compensate Doppler shift, errors in the RTC counter may require additional time adjustment.

Figure 10A:
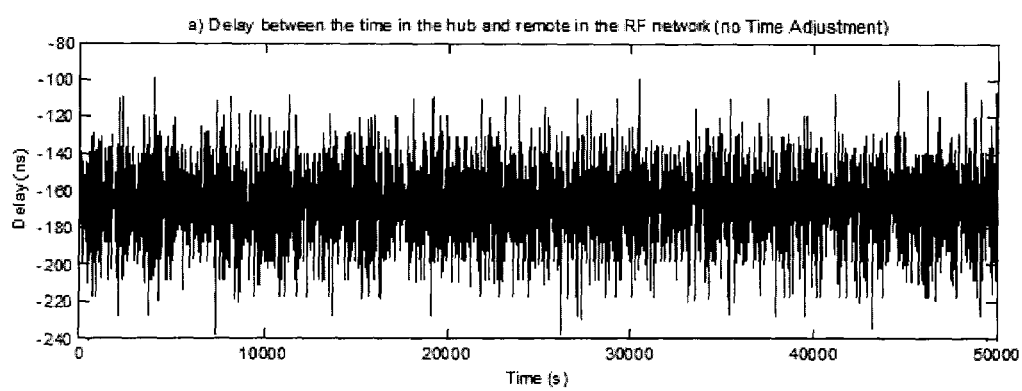
FIG. 10(a) illustrates exemplary time delay data between the hub and remote without time adjustment.
Figure 10B:
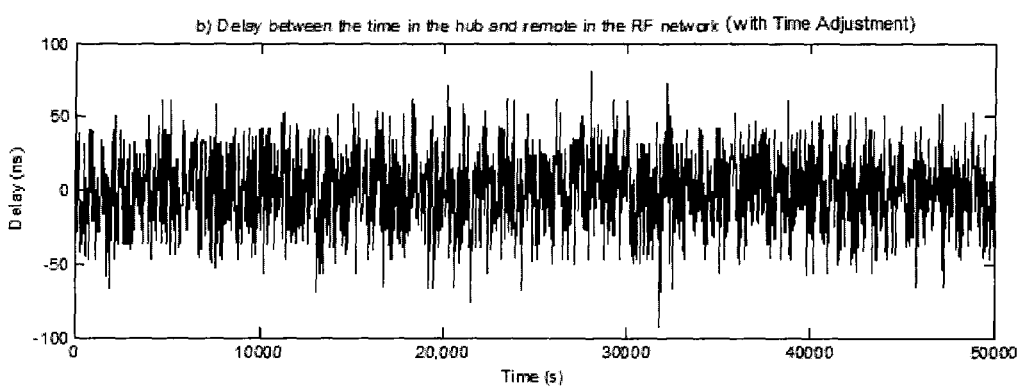
FIG. 10(b) illustrates exemplary time delay data between the hub and remote with time adjustment.

FIG. 10(A) illustrates exemplary time delay between the hub and remote without time adjustment. FIG. 10(N) illustrates exemplary time delay between the hub and remote with time adjustment.

To compensate for time delay caused by (1) differences between clock signals derived from a relatively low precision oscillator that drives the NCR counter and the RTC counter of the remote device and (2) any Doppler shift effect, a time adjustment may be periodically applied to the RTC counter. The time adjustment is calculated as described above with respect to step 510.

The following table illustrates exemplary values for adjustments to the remote RTC counter according to the performance of the NCR process, the RTC correction process, and the time adjustment process.

TABLE 1

| $NCR_{hub}$ | Period $NCR_{hub}$ = | $NCR_{remote}$ | Period $NCR_{remote}$ | $RTC_{hub}$ (ns) | $RTC_{remote}$ (ns) | $\Delta RTC(ns)$ = $RTC_{hub}$ - $RTC_{remote}$ | K = Period $NCR_{remote}$/ Period $NCR_{hub}$ | Actual value of $F_{sys}$ (MHZ) | Period of RTC Counter (ns) |
|---|---|---|---|---|---|---|---|---|---|
| 100 | | 100 | | 2000 | 500 | 1500 | | | |
| Remote RTC is initialized/adjusted by RTC correction process, adding ΔRTC | | | | | 500 + 1500 = 2000 | | | | |
| 8437600 | 8437500 | 8437684 | 8437584 | 31252000 | 31252000 | | 1.0000099 | 10.000099 | 9.9999 |
| 16875100 | 8437500 | 16875268 | 8437584 | 62502000 | 62502000 | | 1.0000099 | 10.000099 | 9.9999 |
| NCR correction process, derivation of $F_{sys}$ illustrates drift of remote RTC due to driving clock signal | | | | | | | | | |
| | | | | 125002000 | 125002010 | -10 | | | |
| Adding ΔRTC to the remote RTC value | | | | | 125002010 - 10 = 125002000 | | | | |
| Removing time offset caused by Doppler frequency shift effect | | | | | | | | | |
| 8437600 | 8437500 | 8437600 | 8437500 | 31252000 | 31252000 | | | | |
| 16875200 | 8437500 | 16875567 | 8437473 | 62502000 | 62502100 | | | | |
| Time adjustment = (Period $NCR_{remote}$ − Period $NCR_{hub}$)/0.27 = 100 ns Is applied to the remote RTC. | | | | | 62502100 + 100 = 62502000 | | | | |

Obviously, numerous modifications and variations of the present invention are possible in light of the above teachings. It is therefore to be understood that within the scope of the appended claims, the invention may be practiced otherwise than as specifically described herein.

The invention claimed is:

1. A hub device for performing time synchronization in a satellite network, the satellite network including the hub device, a remote device and a satellite, the hub device comprising:

a hub real time clock (RTC) counter that is time synchronized to a master clock;

a hub network clock reference (NCR) counter that is continuously driven by a hub clock oscillator having a relatively high precision;

processing circuitry that periodically generates a time packet, the time packet including a hub RTC value of the hub RTC counter and a hub NCR value of the hub NCR counter; and a transmitter that transmits, via the satellite, the generated time packet to the remote device to synchronize a remote RTC counter with the hub RTC counter based on the hub RTC value and the hub NCR value in the generated time packet.

2. The hub device according to claim 1, wherein the remote device extracts the hub RTC value and the hub NCR value from the transmitted time packet, compares contents of the transmitted time packet with contents of a previously transmitted time packet, and adjusts the remote RTC counter based on the result of the comparison to synchronize the remote RTC value at the remote device with the hub RTC value.

3. The hub device according to claim 1, wherein the remote RTC counter and a remote NCR counter are each driven by clock signals derived from a same remote clock oscillator having a relatively low precision, and the remote device synchronizes the remote RTC counter with the hub RTC counter to correct the remote RTC counter due to variations in the driving clock signals derived from the remote clock oscillator having the relatively low precision.

4. The hub device according to claim 1, wherein the remote device calculates a hub period NCR value that is a difference between the hub NCR value of a currently transmitted time packet and a hub NCR value of a previously transmitted time packet, calculates an adjustment time, the adjustment time being a proportion of a difference between a remote period NCR value and the hub period NCR value, and adjusts the remote RTC counter by the adjustment time.

5. The hub device according to claim 1, wherein
the hub RTC counter is time synchronized to the master clock according to precision time protocol (PTP),
the hub RTC counter performs a function of a PTP slave clock, and
the master clock performs a function of a PTP grandmaster clock.

6. The hub device according to claim 1, further comprising a line card that includes the RTC counter, the NCR counter and the transmitter.

7. The hub device according to claim 1, wherein
the processing circuitry further
generates a baseband frame (BBFRAME), and
encapsulates the time packet in the baseband frame, and
the transmitter transmits the time packet within the BBFRAME to the remote device.

8. A remote device that performs time synchronization with a hub device in a satellite network, the satellite network including the remote device, the hub device and a satellite, the remote device comprising:
a remote clock oscillator with a relatively low precision;
a receiver that receives time packets transmitted periodically from the hub device via the satellite, each time packet including a hub real time clock (RTC) value and a hub network clock reference (NCR) value, the hub RTC value representing a value of a hub RTC counter in the hub at a time when the time packet was transmitted to the remote device, the hub NCR value representing a value of a hub NCR counter in the hub at the time when the time packet was transmitted to the remote device, and the hub NCR counter is continuously driven by a hub oscillator having a relatively high precision;
a remote RTC counter that represents a remote RTC value at the remote device;
a remote NCR counter that represents a remote NCR value at the remote device, the remote RTC counter and the remote NCR counter are each driven by clock signals derived from the remote clock oscillator; and
processing circuitry that
extracts the hub RTC value and the hub NCR value from a current time packet,
compares contents of the current time packet with contents of a previously received time packet, and
adjusts the remote RTC counter based on the result of the comparison to synchronize the remote RTC value at the remote device with the hub RTC value.

9. The remote device according to claim 8, wherein the processing circuitry further
calculates an increment period for the remote RTC counter based on the clock signals derived from the remote clock oscillator, and
increments the remote RTC counter every increment period.

10. The remote device according to claim 8, wherein the processing circuitry latches the remote NCR value of the remote NCR counter and the remote RTC value of the remote RTC counter when the receiver receives the current time packet.

11. The remote device according to claim 10, wherein the processing circuitry further
calculates a hub period NCR value, the hub period NCR value being a difference between a current hub NCR value of a currently received time packet and a previous hub NCR value of a previously received time packet,
calculates a remote period NCR value, the remote period NCR value being a difference between a current remote NCR counter value when the receiver receives the currently received time packet and a previous remote NCR counter value when the receiver received the previously received time packet,
calculates an adjustment time, the adjustment time being a proportion of a difference between the remote period NCR value and the hub period NCR value, and
adjusts the remote RTC counter by the adjustment time.

12. The remote device according to claim 8, wherein the processing circuitry further sets the remote RTC counter to the hub RTC value when a difference between the remote RTC counter and the hub RTC value is greater than a predetermined threshold.

13. The remote device according to claim 9, wherein the processing circuitry further
calculates a hub period NCR value, the hub period NCR value being a difference between a current hub NCR value of a currently received time packet and a previous hub NCR value of a previously received time packet,
calculates a remote period NCR value, the remote period NCR value being a difference between a current remote NCR counter value when the receiver receives the currently received time packet and a previous remote NCR counter value when the receiver received the previously received time packet,
derives an adjusted clock frequency $F_{sys}$ for the remote clock oscillator, where $F_{sys}$=(remote period NCR value/hub period NCR value)×$F_{nominal}$, $F_{nominal}$ is a constant known frequency, and
the increment period is inversely proportional to $F_{sys}$.

14. The remote device according to claim 8, further comprising:
a switch, wherein
a client device is connected to the remote device by the switch, and
the client device synchronizes a client time clock with the remote RTC counter.

15. The remote device according to claim 8, wherein
the remote RTC counter is time synchronized to the hub RTC counter of the hub device according to precision time protocol (PTP),
the remote RTC counter performs a function of a PTP master clock, and
the hub RTC counter performs a function of a PTP clock.

16. The remote device according to claim 15, further comprising:
a switch, wherein
a client device is connected to the remote device by the switch, and
the client device synchronizes a client PTP slave clock with the PTP master clock.

17. The remote device according to claim 13, wherein
the processing circuitry further calculates the adjustment time according to the following equation (remote period NCR value−hub period NCR value)/R, where
R is a ratio between the frequency $F_{sys}$ and a frequency of clock signals supplied to the remote RTC counter.

18. The remote device according to claim 8, further comprising a line card that includes the remote RTC counter, the remote NCR counter and the receiver.

19. The remote device according to claim 18, further comprising an antenna, wherein
the receiver of the line card receives the time packet via the antenna.

20. A system for time synchronization in a satellite network, the system comprising:
- a hub device that includes
  - a hub real time clock (RTC) counter that is time synchronized to a master clock;
  - a hub network clock reference (NCR) counter that is continuously driven by a hub clock oscillator having a relatively high precision;
  - processing circuitry that periodically generates a time packet, the time packet including a hub RTC value of the hub RTC counter and a hub NCR value of the hub NCR counter; and
  - a transmitter that transmits, via a satellite, the generated time packet to a remote device; and
- the remote device that includes
  - a remote clock oscillator with a relatively low precision;
  - a receiver that receives the periodically generated time packets from the hub device via the satellite;
  - a remote RTC counter that represents a remote RTC value at the remote device;
  - a remote NCR counter that represents a remote NCR value at the remote device, the remote RTC counter and the remote NCR counter are each driven by clock signals derived from the remote clock oscillator; and
  - processing circuitry that
    - extracts the hub RTC value and the hub NCR value from a current time packet received by the receiver;
    - compares contents of the current time packet with contents of a previously received time packet; and
    - adjusts the remote RTC counter based on the result of the comparison to synchronize the remote RTC value at the remote device with the hub RTC value.

* * * * *